(12) United States Patent
Muneta et al.

(10) Patent No.: US 7,162,311 B2
(45) Date of Patent: Jan. 9, 2007

(54) SAFETY NETWORK SYSTEM, SAFETY SLAVES UNIT, SAFETY CONTROLLER AND COMMUNICATION METHOD AND INFORMATION COLLECTING METHOD AND MONITORING METHOD FOR THE SAFETY NETWORK SYSTEM

(75) Inventors: Yasuo Muneta, Kyoto (JP); Toshiyuki Nakamura, Kyoto (JP); Teruyuki Nakayama, Kyoto (JP)

(73) Assignee: Omron Corporation, Kyoto (JP)

( * ) Notice: Subject to any disclaimer, the term of this patent is extended or adjusted under 35 U.S.C. 154(b) by 285 days.

(21) Appl. No.: 10/478,518

(22) PCT Filed: May 31, 2002

(86) PCT No.: PCT/JP02/05389

§ 371 (c)(1),
(2), (4) Date: Apr. 30, 2004

(87) PCT Pub. No.: WO02/098065

PCT Pub. Date: Dec. 5, 2002

(65) Prior Publication Data

US 2004/0181296 A1    Sep. 16, 2004

(30) Foreign Application Priority Data

May 31, 2001    (JP)    ............................. 2001-164564

(51) Int. Cl.
  *G05B 11/01*    (2006.01)
  *G05B 19/18*    (2006.01)
  *G06F 15/16*    (2006.01)
(52) U.S. Cl. ............................. 700/21; 700/3; 709/208
(58) Field of Classification Search ................. 700/2–3, 700/5, 21, 79–82; 709/208, 209, 210, 211; 710/110

See application file for complete search history.

(56) References Cited

U.S. PATENT DOCUMENTS

| | | | |
|---|---|---|---|
| 4,625,308 A | 11/1986 | Kim et al. | |
| 4,715,031 A | 12/1987 | Crawford et al. | |
| 4,750,171 A | 6/1988 | Kedar et al. | |
| 5,218,680 A | 6/1993 | Farrell et al. | |
| 5,400,018 A | 3/1995 | Scholl et al. | |
| 5,732,094 A | 3/1998 | Petersen et al. | |
| 5,850,338 A | 12/1998 | Fujishima | |
| 5,907,689 A | 5/1999 | Tavallaei et al. | |
| 5,919,046 A * | 7/1999 | Hull ........................... | 434/258 |

(Continued)

FOREIGN PATENT DOCUMENTS

EP    0905594 A1    3/1999

(Continued)

*Primary Examiner*—Thomas Pham
(74) *Attorney, Agent, or Firm*—Foley & Lardner LLP

(57) ABSTRACT

A safety PLC 1 and at least a safety slave unit 2 are connected through a safety network 3. The safety slave unit has the safety information transmission function for transmitting the safety information for determining whether a safe state prevails or not and the unsafety information transmission function for transmitting the unsafety information containing no safety information. The unsafety information transmission function transmits the unsafety information on condition that the safety slave unit is in a safe state. Specifically, in the case where it is determined that no safe state prevails at the timing of transmitting the unsafety information, the unsafety information is not sent but the safety is transmitted. A safety controller, upon receipt of the unsafety information, estimates that the safety slave unit at the transmitting end of the particular unsafety information is in a safe state.

11 Claims, 14 Drawing Sheets

U.S. PATENT DOCUMENTS

| | | |
|---|---|---|
| H001882 H | 10/2000 | Asthana et al. |
| 6,218,951 B1 * | 4/2001 | Colvin ............... 340/635 |
| 6,389,480 B1 | 5/2002 | Kotzur et al. |
| 6,442,511 B1 * | 8/2002 | Sarangapani et al. ....... 702/194 |
| 6,473,660 B1 * | 10/2002 | Thibault ............... 700/79 |
| 6,574,234 B1 | 6/2003 | Myer et al. |
| 6,640,268 B1 | 10/2003 | Kumar |
| 6,741,951 B1 * | 5/2004 | Whaling et al. ............ 702/179 |
| 2002/0082060 A1 | 6/2002 | Kang et al. |
| 2003/0037170 A1 | 2/2003 | Zeller et al. |
| 2003/0148760 A1 | 8/2003 | Takayanagi |
| 2004/0018817 A1 | 1/2004 | Kanayama et al. |
| 2004/0125821 A1 | 7/2004 | Kuhl |
| 2004/0210323 A1 | 10/2004 | Muneta et al. |
| 2004/0210326 A1 | 10/2004 | Muneta et al. |
| 2004/0210620 A1 | 10/2004 | Muneta et al. |
| 2004/0215354 A1 | 10/2004 | Nakamura et al. |
| 2005/0017875 A1 | 1/2005 | Nakayama et al. |

FOREIGN PATENT DOCUMENTS

| | | |
|---|---|---|
| GB | 2267984 A | 12/1993 |
| GB | 2307068 A | 5/1997 |
| JP | 60-062482 | 4/1985 |
| JP | 03-116395 | 5/1991 |
| JP | 04-045697 A | 2/1992 |
| JP | 05-37980 A | 2/1993 |
| JP | 06-324719 A | 10/1995 |
| JP | 07-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO 02/098065 A1 | 12/2002 |

* cited by examiner

ID bit = 1 — safety information
ID bit = 0 — unsafety information

| | Sequence No. (master unit transmission) | 1 | | | 2 | | | 3 | | |
|---|---|---|---|---|---|---|---|---|---|---|
| | Safety OK | | | | | | Safety OK | | | |
| | | Safety response | Safety response | Unsafety information | Safety response | Safety response | Unsafety information | Safety response | Safety response | Safety response |
| | Slave unit transmission data | 1 | 1 | 0 | 1 | 1 | 0 | 1 | 1 | 1 |
| | ID bit (added by slave unit) | Safe | Safe | Safe | Safe | Safe | Safe | Safe | Safe | Safe |
| | Check master unit safety | Nil | Nil | Received | Nil | Nil | Received | Nil | Nil | Nil |
| | Master unit unsafety information | | | | | | | | | |

(b)

| | Sequence No. (master unit transmission) | 1 | | | 2 | | | 3 |
|---|---|---|---|---|---|---|---|---|
| | Safety OK | | | | | | Safety NG | |
| | | Safety response | Safety response | Unsafety information | Safety response | Safety response | Unsafety information | Safety response |
| | Slave unit transmission data | 1 | 1 | 0 | 1 | 1 | 0 | 1 |
| | ID bit (added by slave unit) | Safe | Safe | Safe | Safe | Safe | Safe | Hazardous |
| | Check master unit safety | Nil | Nil | Received | Nil | Nil | Received | Nil |
| | Master unit unsafety information | | | | | | | |

ID bit = 1 – safety information
ID bit = 0 – unsafety information

SAFETY NETWORK SYSTEM, SAFETY SLAVES UNIT, SAFETY CONTROLLER AND COMMUNICATION METHOD AND INFORMATION COLLECTING METHOD AND MONITORING METHOD FOR THE SAFETY NETWORK SYSTEM

This application is a U.S. National Stage application of PCT/JP02/05389 filed May 31, 2002, which claims benefit to Japanese application 2001-164564 filed May 31, 2001 and is herein incorporated in its entirety by reference.

TECHNICAL FIELD

The present invention relates to a safety network system, a safety slave unit, a safety controller and a communication method, and an information collecting method and a monitoring method for the safety network system.

BACKGROUND ART

A programmable controller (hereinafter referred to as "PLC") used for factory automation (hereinafter referred to as "FA") performs the control operation in such a manner that the on/off information is input from an input device such as a switch or a sensor, the logical operation is executed according to a sequence program (also called a user program) written in the ladder language or the like, and in accordance with the operation result thus determined, on/off information signals are output to an output device such as a relay, a valve or an actuator.

The PLC is connected to the input devices or the output devices either directly or through a network. In the case where a network system connected by a network is constructed, the on/off information is transmitted and received through the network. In the process, the information are transmitted by a master slave method in which the PLC normally acts as a master unit, and the devices as slave units.

In recent years, on the other hand, a fail-safe (safety) system has been introduced also in the PLC operation. Specifically, not only the PLC and the devices but the network has a security function built therein. The security function is the one for confirming safety and producing an output. In the case where the network system enters a hazardous state as an emergency stop switch is depressed or a sensor such as a light curtain detects intrusion of a person (a part of a human body), the fail-safe system is so activated that the safety system turns to the safety side and halts the operation. In other words, the aforementioned safety functions cause the system to produce an output and operate a machine only when safety is stored. Unless safety cannot be confirmed, therefore, the machine stops.

In a network system having the safety functions (safety network system) described above, the maximum response time from the occurrence of a fault, a hazardous situation or other unsafe state to the execution of the safety operation (device halt, etc.) is required to be kept constant. Specifically, in the case where information are transmitted by the master-slave method, as well known, the slave units return a safety response to a master unit sequentially in response to the request of the master unit, as shown in FIG. 1(a). In the shown case, three slave units constitute a network system. The on/off information handled here are I/O information for safety control in the form of normal (safe) or fault (hazardous). The maximum response time guarantees the time consumed for each communication cycle.

On the other hand, demand is high for collecting complementary information (unsafety information) other than the safety information described above, such as the slave unit status, the turn-on time and the number of times operated, for monitoring the slave units and the devices connected to the slave units. By acquiring these unsafety information, the life of the devices, for example, can be determined, and the devices can be replaced before they actually develop a malfunction and the system halts.

The unsafety information may be sent, for example, as shown in FIG. 1(a) in which only the unsafety information are transmitted in the communication cycle 1 while only the safety information is transmitted in the next communication cycle 2. According to this method, however, the safety information cannot be sent during the communication cycle 1, and therefore the maximum response time is as long as twice the length of the communication cycle.

As another method, as shown in FIG. 1(b), the safety response for transmitting the safety information in response to a request of a master unit can be returned with the unsafety information added thereto. Also in this case, as compared with the case of FIG. 1(a) in which only the safety response is returned, each communication cycle consumes a longer time. In any of these methods, therefore, the demand for shortening the maximum response time cannot be satisfied.

The object of this invention is to provide a safety network system, a safety slave unit, a safety controller and a communication method, and an information collecting method and a monitoring method for the safety network system in which the response time of the original safety signal is not delayed even in the case where the information other than the safety signal are transmitted or received while the system is in operation.

DISCLOSURE OF THE INVENTION

In order to achieve the object described above, a safety network system according to this invention is constructed by connecting a safety controller and a safety slave unit to each other through a safety network. The safety network system is such that in the case where an abnormal or hazardous or other unsafe situation occurs in the network system, the fail-safe function is activated to avoid the abnormality or hazard. The safety controller, the safety slave unit and the safety network are devices used for the fail-safe processing.

The safety slave unit includes a safety information transmission function for transmitting the safety information for determining whether a safe state prevails or not and an unsafety information transmission function for transmitting the unsafety information containing no safety information. The unsafety information transmission function is configured to transmit the unsafety information on condition that the safety slave unit is in a safe state.

Preferably, the safety slave unit has the function of transmitting safety without sending the unsafety information in the case where it is determined that no safe state prevails at the timing of transmitting the unsafety information.

The communication method according to this invention is used for the safety network system constructed by connecting a safety controller and a safety slave unit to each other through a safety network. The safety slave unit executes the process of transmitting the safety information for determining whether a safe state prevails or not or the unsafety information containing no safety information, toward the safety controller through the safety network at a predetermined timing. In the process, the process of transmitting the unsafety information is executed on condition that the safety slave unit is in a safe state.

The safety slave unit according to this invention has the safety information transmission function for transmitting the safety information for determining whether a safe state prevails and the unsafety information transmission function for transmitting the unsafety information containing no safety information. The unsafety information transmission function is so configured as to transmit the unsafety information on condition that a safe state prevails. Each transmission function of the safety slave unit is implemented by a MPU 23 according to an embodiment.

Further, the safety controller according to this invention has the fail-safe processing function for analyzing the contents of the safety information received from the safety slave unit, and upon determination that no safe state prevails, executing a predetermined process, and the function for estimating that the safety slave unit of the transmitting end is in a safe state in the case where the unsafety information is received.

According to this invention, the fact that the unsafety information is transmitted indicates that the safety of the safety slave unit is guaranteed. In the case where the safety slave unit is in a safe state, therefore, the safety controller, upon receipt of the safety information, can indirectly ascertain that the safety slave unit is in a safe state, and upon receipt of the unsafety information, can indirectly ascertain that the safety slave unit is in a safe state. Also, suppose the safe state ceases at the timing of transmitting the unsafety state, the safety information indicating that no safe state prevails (hazardous or abnormal) is transmitted. In the case where the safe state ceases, therefore, the response time before activation of the fail-safe function need not be extended.

In this way, the time of updating the unsafety information required by the user can be set. Even in the case where the unsafety information is transmitted, the safe state is be guaranteed, and therefore the response time is not as long as in the case where the safety information is transmitted each time.

In other words, the unsafety information can be notified from the slave unit (safety slave unit) to the master unit (safety controller) without affecting the traffic of the safety network. As a result, the update time of the unsafety information can be set by the user, thereby making possible the management suitable for the user applications. Also, since the unsafety information can be collected without halting the system, the devices can be monitored on line.

The transmission timing of the unsafety information may be controlled either on the part of the safety controller or on the part of the safety slave unit. Specifically, the former can be implemented by the safety controller including unsafety information request control means for controlling the timing of issuing an unsafety information transmission request. The safety slave unit to meet this situation can be so configured as to determine whether the request received from the safety controller concerns the safety information or the unsafety information, and in the case of the safety information request, transmits the safety information. In the case of the request for the unsafety information, on the other hand, the safety slave unit transmits the unsafety information in the case where the particular slave unit is in a safe state and transmits the safety information in the case where the slave unit is not in a safe state. In the latter case, the safety slave unit includes unsafety information transmission control means for controlling the timing of transmitting the unsafety information, and has such a configuration that the unsafety information is transmitted on condition that no safe state prevails at the time of transmission. Also, the specific value of the transmission timing may be set either by the maker at the time of manufacture or by the user.

The safety information contains the information as to whether at least the slave unit and/or the safety devices connected thereto are in a safe state or not. Nevertheless, other information may of course be also contained. The unsafety information, in contrast, are various information containing no safety information. The relay life, the investigation result, the turn-on time, the number of times operated and the model are some examples. The "turn-on time" and the "number of times operated", for example, are determined by measuring or counting with the timer or counter, and the numerical values as of the time of measurement is sent as unsafety information. The "relay life" is a life prediction. Specifically, the relay life representing the unsafety information as it is called here is not the information indicating that the life has expired and no safety operation is possible (in which case the information is handled as safety information) but predictive information that although the relay is operating safely, the time requiring maintenance (change, readjustment, etc.) is approaching. The "investigation result" is the information predicted or detected statistically. In other words, it is not the result of the self-diagnosis conducted as to safety on the part of the slave unit. The self-diagnosis result is sent as safety information. Examples of the inspection result as unsafety information includes the following: (1) life has almost expired, (2) the relay is used in an unfavorable environment, (3) temperature, (4) vibrations, (5) supplied voltage, and (6) used in overloaded state. By acquiring these information, early maintenance work (change, readjustment, etc.) is made possible, thereby preventing a case in which the relay becomes inoperative upon expiry of life or a fault has an excessively large effect.

Further, the information collecting method for the safety network system according to this invention presupposes a safety network system constructed by connecting the safety controller and the safety slave unit through the safety network. The safety slave unit has the safety information transmission function for transmitting the safety information for determining whether a safe state prevails or not and the unsafety information transmission function for transmitting the unsafety information containing no safety information. The unsafety information transmission function is for transmitting the unsafety information on condition that the safety slave unit is in a safe state. When the safety slave unit transmits information to ward the safety controller, the unsafety information transmission function determines which of the safety information and the unsafety information is to be transmitted, and transmits the information thus determined through the safety network. The safety controller receives the safety information or the unsafety information sent through the safety network, and in the case where the received information is the unsafety information, stores the information based on the particular unsafety information.

By doing so, the safety controller can acquire the unsafety information from the safety slave unit connected to the safety network. In addition, in the case where no safe state prevails at the timing of transmitting the unsafety information, the safety information is sent, and therefore the unsafety information can be collected without deteriorating the reliability of the safety system. Also, in the case where the unsafety information is collected, safety can be indirectly recognized.

The monitor method according to this invention is for a system constructed by connecting a monitor device further to the safety network system constructed by connecting the safety controller and the safety slave unit to each other through the safety network. The safety slave has the safety information transmission function for transmitting the safety information for determining whether a safe state prevails or not and the unsafety information transmission function for transmitting the unsafety information containing no safety information. The unsafety information transmission function is for transmitting the unsafety information on condition that the safety slave unit is in a safe state. The monitor device acquires the unsafety information transmitted toward the safety controller from the safety slave unit, analyzes the unsafety information thus acquired, and stores the information based on the particular unsafety information.

The monitor device is connected to the safety controller and can acquire the unsafety information indirectly through the safety controller. Also, the unsafety information can be directly collected by connecting the monitor device to the safety network, monitoring the frames transmitted on the safety network and receiving the unsafety information addressed to the safety controller.

The monitor device can acquire the unsafety information from the safety slave unit connected to the safety network. In addition, in the case where no safe state prevails at the timing of transmitting the unsafety information, the safety information is sent. Therefore, the unsafety information can be collected and the monitoring operation can be performed without deteriorating the reliability of the safety system. By the way, the data can be stored in any of various forms including the logging data. In addition, in the case where the unsafety information is acquired, it can be indirectly recognized that the safety system is in a safe state. This monitor device corresponds to the tool of the personal computer 5. Also, the devices called the monitoring device and the configurator correspond to the monitor device.

BRIEF DESCRIPTION OF THE DRAWINGS

FIG. 11 is a diagram for explaining the operation of this embodiment.

BEST MODE FOR CARRYING OUT THE INVENTION

Figure 2:
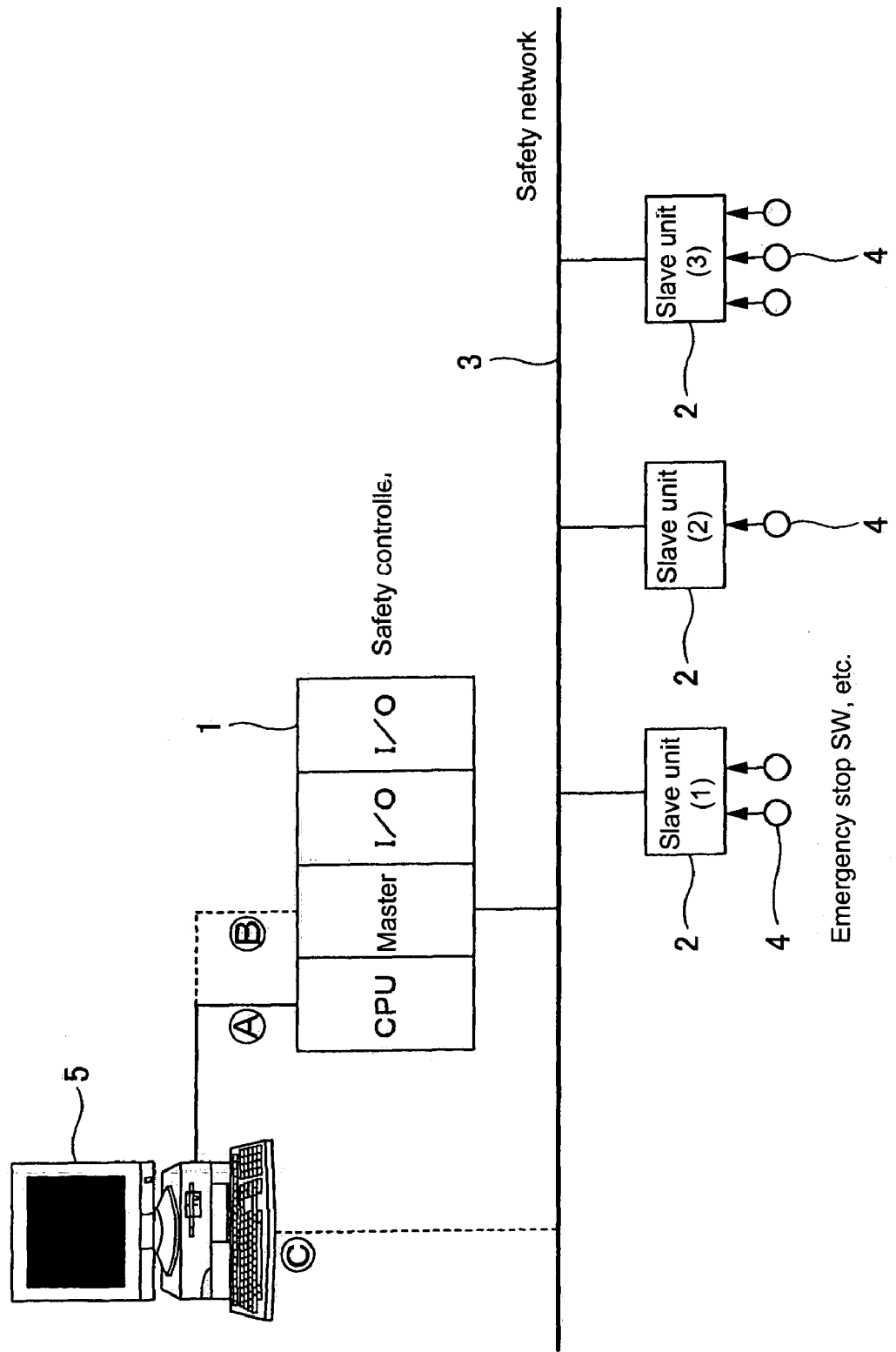
FIG. 2 is a diagram showing a safety network system according to a preferred embodiment of the invention.

This invention is explained in detail with reference to the accompanying drawings. Specifically, FIG. 2 shows an example of a safety network system according to this invention. As shown in FIG. 2, a safety PLC 1 and a plurality of safety slave units 2 are connected to each other through a safety network 3. Each safety slave unit 2 is connected with an emergency stop switch and other various safety devices 4 such as various input devices and output devices. The safety PLC 1 is configured of a plurality of units including a CPU unit 1a, a master unit (communication unit) 1b and an I/O unit 1c connected to each other.

Further, a personal computer 5 is connectable as a tool to the CPU unit 1a and the master unit 1b of the safety PLC 1 and the safety network 3. This personal computer 5, through the safety PLC 1, collects and manages the information on the safety slave units 2 and the safety devices 4 connected thereto.

All of the various devices making up this safety network system have a built-in safety (fail-safe) function. The safety function is for confirming the safety and produces an (control) output. Once a hazardous situation arrives, the fail-safe function is activated and the system turns to safety side to halt the operation. Specifically, the safety system is such that when the emergency stop switch is depressed, a sensor such as a light curtain detects the intrusion of a person (a part of human body) or otherwise a hazardous situation of the network system arrives, the fail-safe function works and the system turns to safety side to halt the operation. In other words, this system allows an output to be produced and a machine to operate only in the case where safety is stored by the safety functions. Unless safety cannot be confirmed, therefore, the machine stops.

Next, of these safety functions, the transmission and receiving of information constituting the essential feature of the invention is explained. The master unit 1b has a built-in communication function and is adapted to transmit and receive information to and from the safety slave units 2 by the master-slave method. The basic operation is similar to that of the prior art, and as shown in FIG. 1(a), in compliance with the request from the safety PLC 1 (master unit 1b), a given safety slave unit 2 that has received the particular request returns the safety information as a safety response. The request is issued to the slave units 2 in the order of (1)→(2)→(3), and the safety information are collected from all the three safety slave units 2 in one communication cycle. This communication cycle is repeatedly executed.

Figure 3:
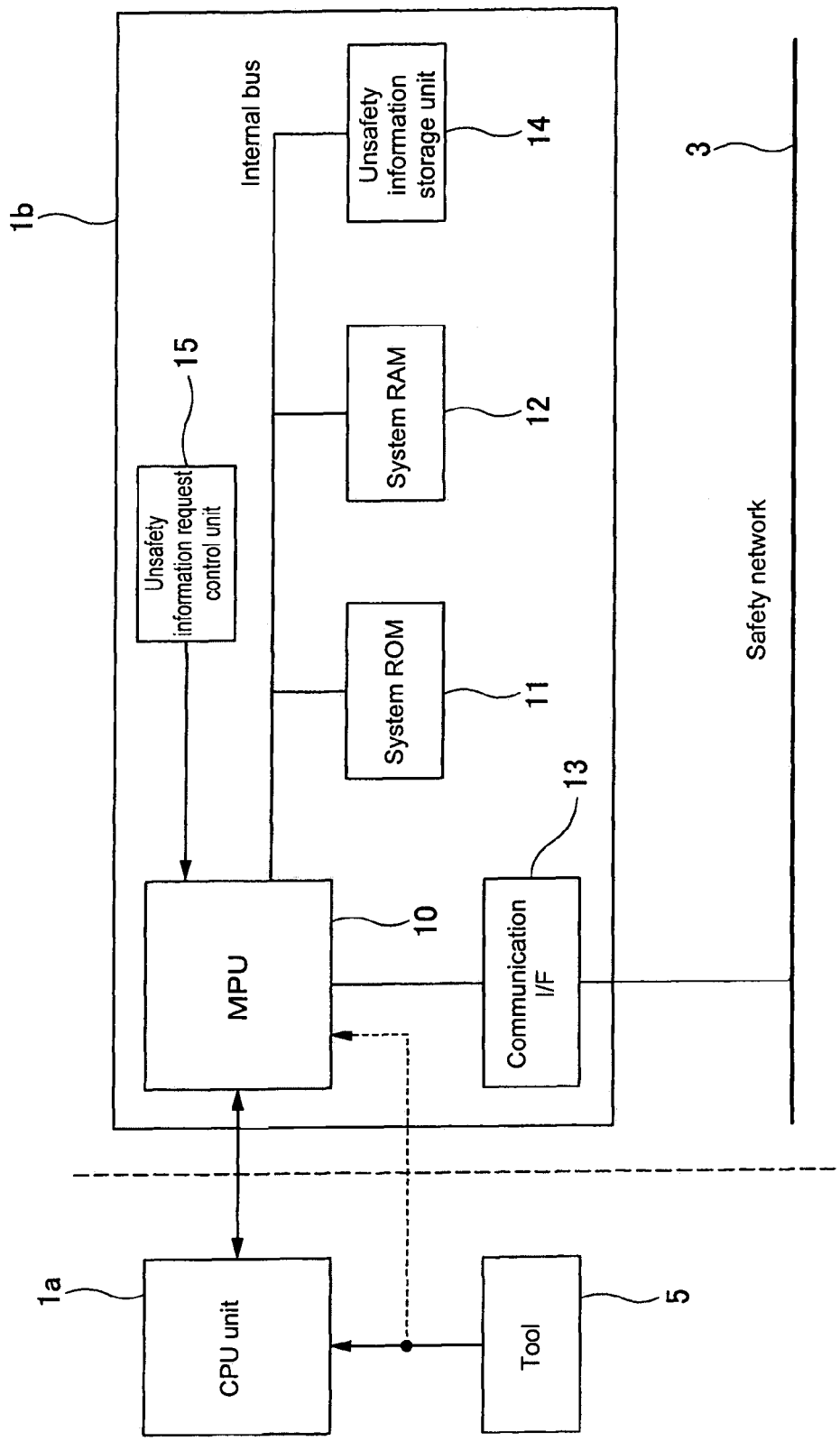
FIG. 3 is a diagram showing the essential parts of a safety controller (PLC) according to a preferred embodiment of the invention.

The master unit 1b for controlling the communication has an internal structure as shown in FIG. 3. Specifically, the master unit 1b has a MPU 10 for reading the program stored in a system ROM 11 and executing a predetermined process appropriately using the memory area of a system RAM 12. Further, the master unit 1b has a communication interface 13 connected to the safety network 3 to transmit and receive the data to and from a predetermined safety slave unit 2. Furthermore, the master unit 1b has an unsafety information storage unit 14 for storing the unsafety information sent from the safety slave units 2. Specifically, also according to this embodiment, as in the prior art, the unsafety information is sent from each safety slave unit 2, and store d by relating it to the addresses of the safety slave units. The unsafety information of the safety slave units stored in the unsafety information storage unit 14 are extracted periodically or in compliance with a read instruction of the personal computer (tool) 5.

Naturally, this master unit 1b also corresponds to the safety network system and has various built-in safety functions. Specifically, though not shown, two MPUs 10 are provided and caused to execute the same program at the same time, and only in the case where the two results are coincident, the output is determined as correct and processed. Other safety functions are of course provided in correspondence with the safety network system.

As an example of the program executed by the MPU 10 of the master unit 1b, the MPU 10 issues a request to a predetermined slave unit 2, and receiving a response to the request, executes a predetermined process in accordance with the contents of the response received. The MPU 10 of course also executes the process of transmitting the information to a predetermined slave unit 2 in compliance with an instruction from the CPU unit 1a.

Figure 4:
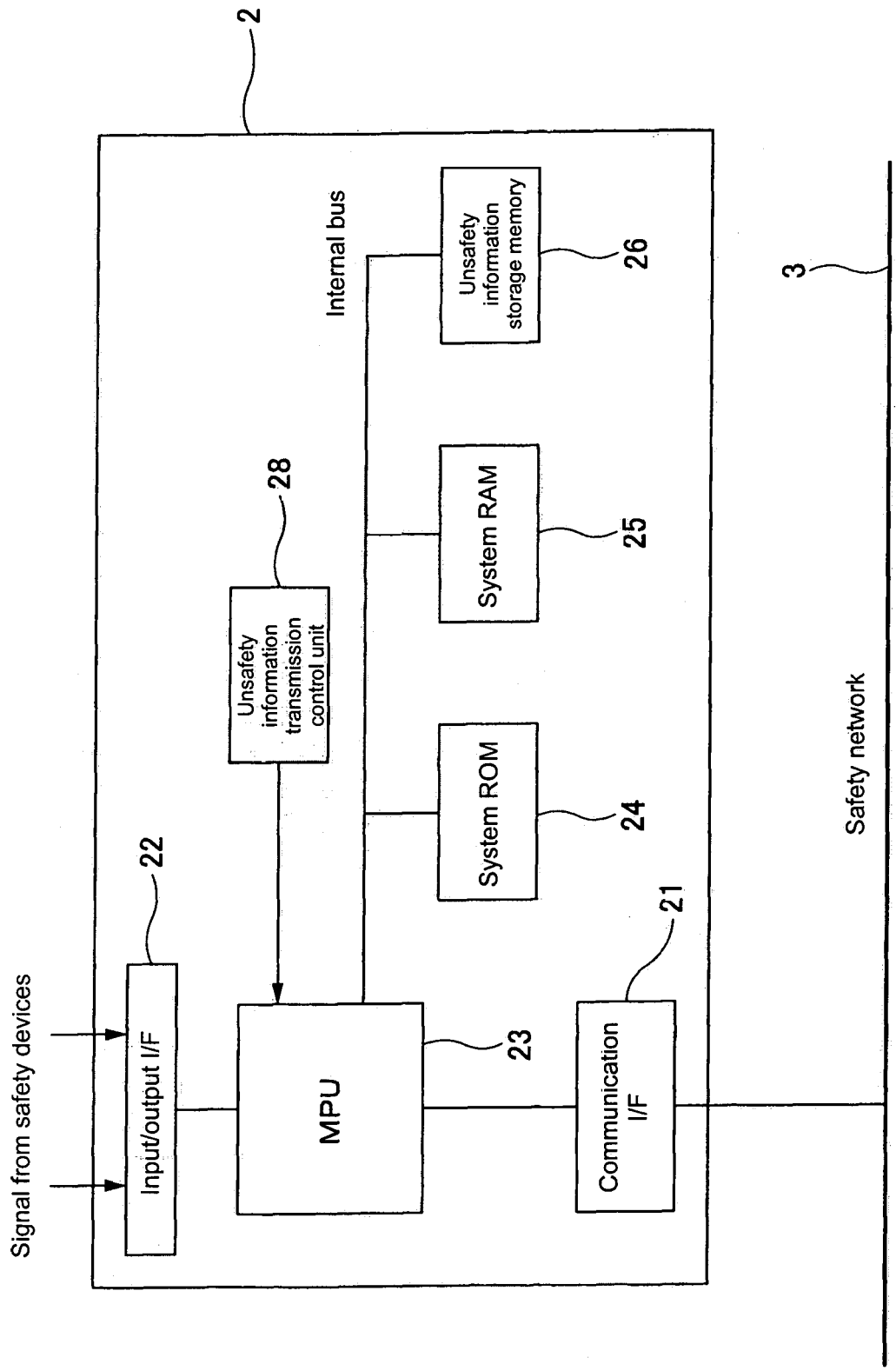
FIG. 4 is a diagram showing a safety slave unit according to a preferred embodiment of the invention.

The internal structure of the safety slave unit 2 is shown in FIG. 4. As shown in this drawing, the safety slave unit 2 includes a communication interface 21 connected to the safety network 3 for transmitting and receiving the data to and from the safety PLC 1 (master unit 1b), an input/output interface 22 for transmitting and receiving the data to and from the safety devices 4 connected to the safety slave units 2, and a MPU 23 for reading the program stored in the system ROM 24 and executing a predetermined process by appropriately using the memory area of the system RAM 25. The MPU 23, in compliance with the request to oneself received through the communication interface 21, executes the process of returning the information (the safety information, etc.) acquired from the safety devices 4 through the input/output interface 22, to the master unit 1b through the communication interface 21 and the safety network 3.

Further, the MPU 23 has the function of self-diagnosis and monitoring the operating conditions (the turn-on time, the number of times turned on/off, etc.) of the safety devices 4, and executes the process of storing in the unsafety information storage memory 26 the unsafety information such as the diagnosis result and the operating conditions acquired by activating the various functions. The unsafety information stored in the unsafety information storage memory 26 are also returned in compliance with the request of the master unit 1b and transmitted to the master unit 1b.

Specifically, the request from the master unit 1b is of two types including the safety information request and the unsafety information request, and the safety slave units 2 return the required type of information as a response. Actually, a request is issued with a sequence No. which is incremented by one each time of transmission, and according to the value of this sequence No., each safety slave unit determines whether a given request concerns the safety information or the unsafety information.

According to this embodiment, the master unit 1b has an unsafety information request control unit 15 for arbitrarily setting the timing of collecting the unsafety information from each safety slave unit 2 to execute the required process. Specifically, the unsafety information request control unit 15, which includes a timer or a counter, sends a trigger signal to the MPU 10 upon each lapse of a predetermined length of time or for each predetermined number of communication cycles. The MPU 10 normally issues a request for acquiring the safety information, and upon receipt of a trigger signal, issues a request to acquire the unsafety information in the next one cycle. By doing so, the unsafety information can be collected in cycles set by the user. This is of course possible even while the system is in operation. The processing function of the MPU 10 with regard to the output of this request is described in detail later.

The safety slave unit 2, on the other hand, returns the safety information or the unsafety information in compliance with the request from the master unit 1b, as described above. In the process, the safety slave unit 2 further executes the process described below. Specifically, in the case where the safety information is requested, the safety information currently available is returned as it is. In the case where the unsafety information is requested, on the other hand, it is first determined whet her the particular safety slave unit 2 is in a safe state or not, and in the case where it is in a safe state, the unsafety information is returned, while in the case where the safety slave unit 2 is not in a safe state (hazardous, or abnormal), the safety information is transmitted. The safety information as used in this case is indicative of a "fault notice".

By doing so, in the case where the unsafety information arrives, the safe state of the safety slave unit 2 that has sent the particular unsafety information is guaranteed. Therefore, the master unit 1b, upon receipt of a response of unsafety information from the safety slave unit 2 in compliance with the unsafety information request, determines that a safe state prevails, and thus can collect the unsafety information as originally intended without the need of the fail-safe process such as emergency stop. In the case where the safety slave unit 2 is not in a safe state, on the other hand, the safety information (fault notice) is sent even in the case where the request of the unsafety information is issued, and therefore a predetermined security process is executed. In this way, the time requiring one communication cycle is guaranteed as a response time in case of a fault.

Figure 5:
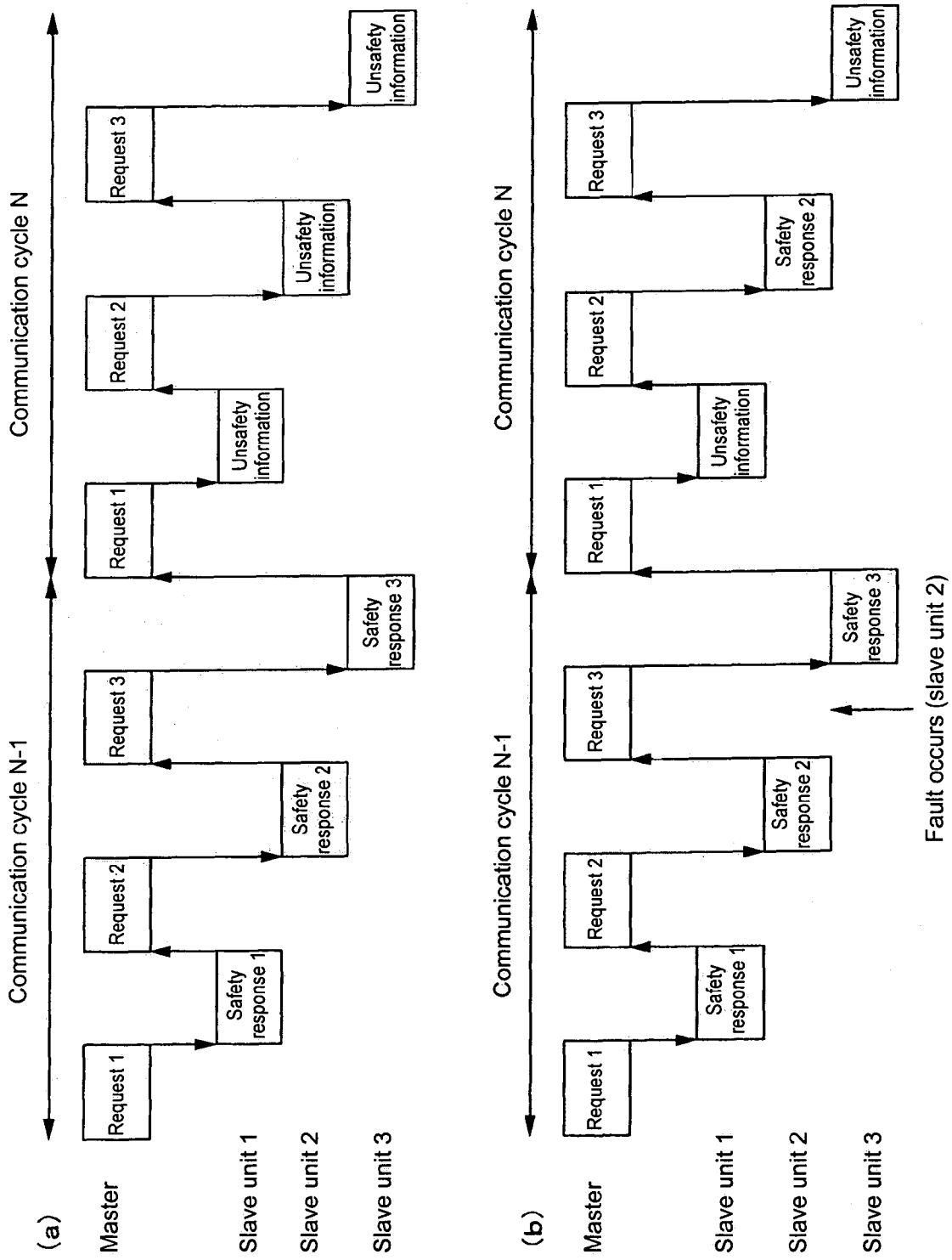
FIG. 5 is a diagram for explaining the operation of this embodiment.

As an example, assume that, as shown in FIG. 5, a normal safety information request is given in the (N-1)th communication cycle while an unsafety information request is issued in the Nth communication cycle. In the case where each safety slave unit 2 is in a safe state, as shown in FIG. 5(a), the type of information requested is returned from each safety slave unit. In the case where a fault occurs after the safety slave unit (2) returns the safety response in the (N-1)th communication cycle, on the other hand, the safety slave unit (2) sends a safety response in the next Nth communication cycle. Therefore, the time t from the fault occurrence to the output of the safety response is shorter than the time T0 of one communication cycle.

Figure 6:
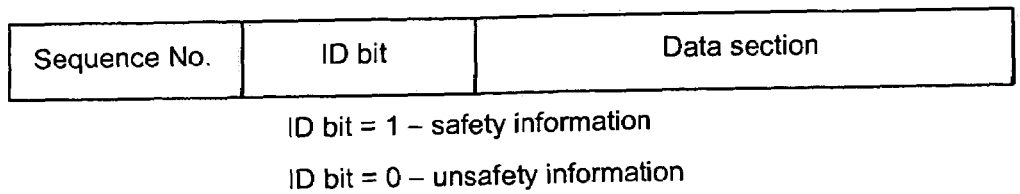
FIG. 6 is a diagram showing an example of the data structure of the transmission frame.

To realize the above-mentioned process, it is necessary to discriminate whether the information received on the part of the master unit 1b is the safety information or the unsafety information. According to this embodiment, as shown in FIG. 6, an identification bit is added to discriminate the safety information and the unsafety information from each other as information stored in the transmission frame. As a result, the master unit 1b can determine whether the received transmission frame is the safety information or the unsafety information by checking the value of the identification bit.

Figure 1:
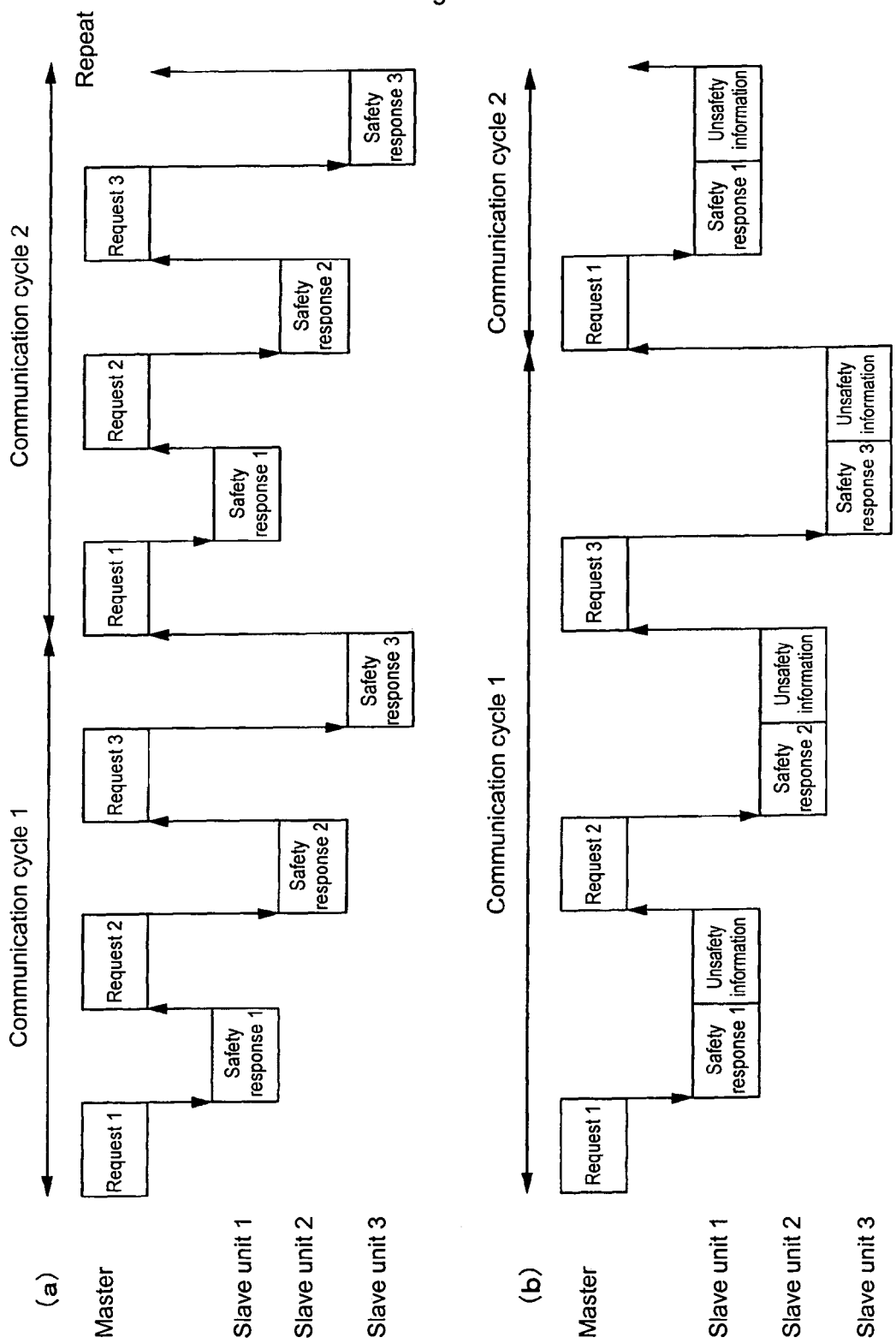
FIG. 1 is a diagram showing the prior art.
Figure 7:
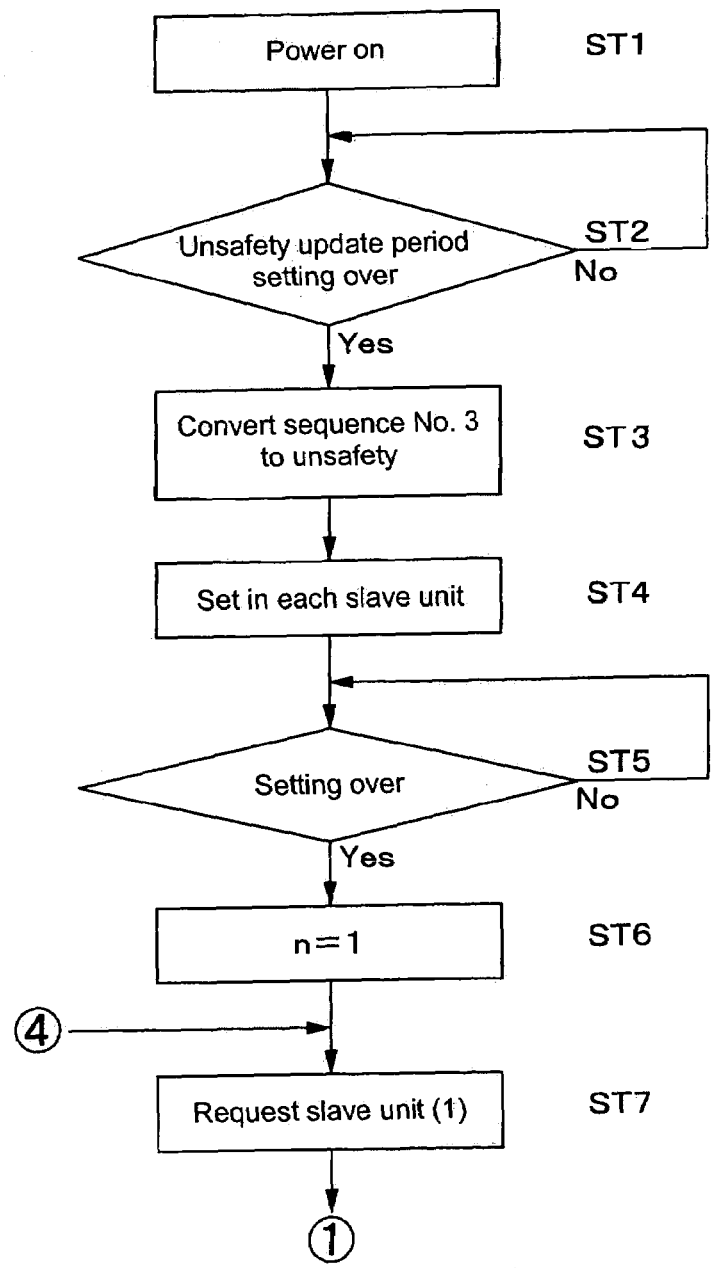
FIG. 7 shows a part of the flowchart for explaining the functions of the MPU of the safety PLC (master unit)
Figure 8:
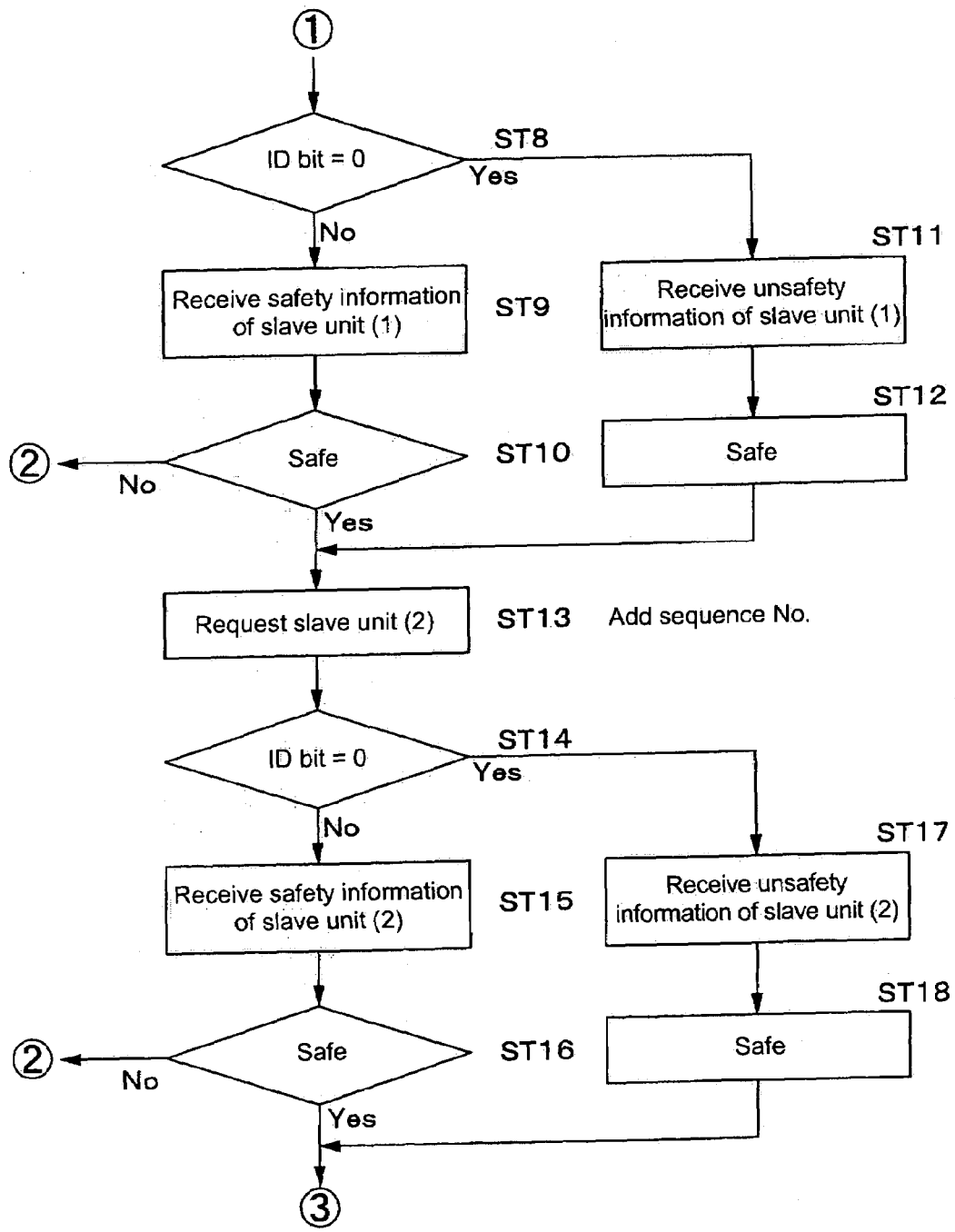
FIG. 8 shows a part of the flowchart for explaining the functions of the MPU of the safety PLC (master unit).
Figure 9:
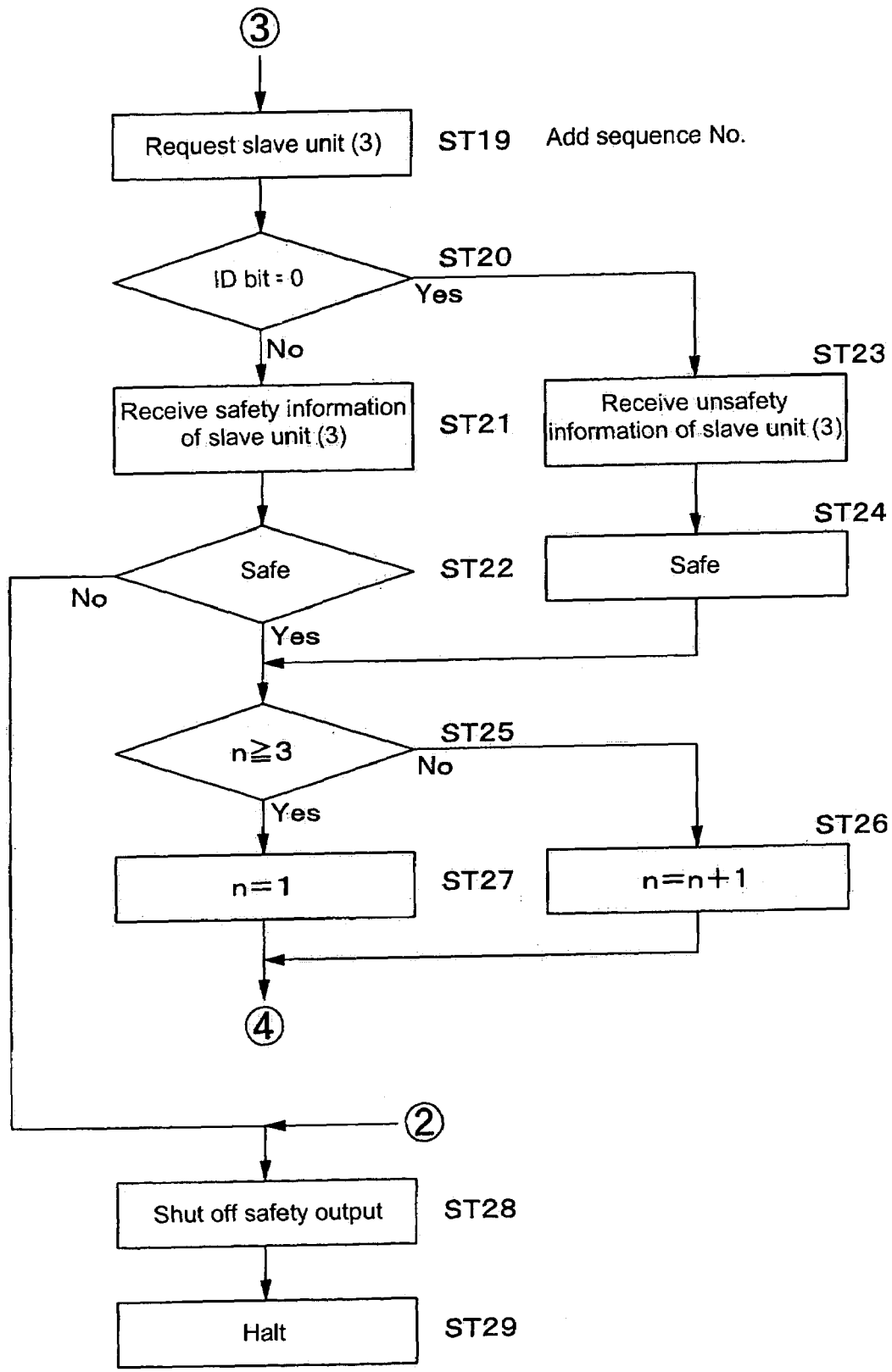
FIG. 9 shows a part of the flowchart for explaining the functions of the MPU of the safety PLC (master unit).

Next, an explanation is given about the processing steps executed in the MPU 10 of the safety PLC 1 (master unit 1b) and the MPU 23 of the safety slave units 2 for conducting a series of the data communication described above. The MPU 10 of the master unit 1b has the function of executing the steps of the flowcharts shown in FIGS. 7 to 9. Assume that there are three safety slave units (1) to (3) as shown in FIG. 1, and the unsafety information is updated at intervals in terms of communication cycles and acquired at the rate of one of three communication cycles.

Once power is switched on, the arrival of the setting input for the unsafety information update period from the user is awaited (ST1, ST2). Upon setting of the unsafety information update period (each three communication cycles in this embodiment), the sequence No. 3 is set to unsafety (ST3), and the sequence No. 3 of the slave units ((1) to (3)) is set to request the unsafety information (ST4, ST5). According to this embodiment, the update period is set by the unsafety information request control unit 15.

In the case where the update timing is once every N times, the conversion to unsafety in step 3 is of course is to set the sequence No. "N" to unsafety. Also, according to this embodiment, the unsafety information is collected in the same communication cycle (the third communication cycle in this embodiment) for all the safety slave units. Alternatively, however, the cycle can be set for each safety slave unit, so that the unsafety information may be collected in different communication cycles. Further, the update period can be varied from one slave unit to another.

Upon completion of each process described above, the safety network system is actually activated to perform a predetermined control operation. Specifically, the value n of the sequence No. is first set to 1 (ST6) and a request is transmitted to the safety slave unit (1) (ST7). This request is accompanied by the sequence No. Thus, the first request after power is thrown in is the sequence No. "1".

The response from the safety slave unit (1) is awaited, and upon receipt of the transmission frame from the safety slave unit (1), the identification bit is analyzed to determine whether th e value is "0" or not (ST8). In the case where the identification bit is not "0", i.e. it is "1", the safety information has been transmitted. This data section is analyzed and the safety information of the safety slave unit (1) is received (ST9). It is then determined whether the safety state is "safe" or not (ST10), and in the case of "safe", a request with the sequence No. is transmitted to the safety slave unit (2).

In the case where the branching decision in step 8 is "Yes", that is to say, the identification bit is 0, the information that has been sent is the unsafety information. Therefore, the process jumps to step 11 and the unsafety information for the safety slave unit (1) is received (step ST11). Also, the current safety state of the safety slave unit (1) is estimated as safe (ST12). After that, the process proceeds to step 13 for outputting a request to the slave unit (2).

A similar process is executed for the safety slave unit (2) (ST13 to ST18), and then for the safety slave unit (3) (ST19 to ST24). As a result, the safety information or the unsafety information can be collected in one communication cycle.

Once the information are acquired from the three safety slave units (1) to (3), it is determined whether n is 3 or more (ST25), and in the case where n is less than 3, n is incremented by 1 (ST26), while in the case where n is not less than 3, n is set to 1 (ST27). After that, the process returns to step 7, and the next communication cycle is executed. After that, the process of steps 7 to 28 is repeatedly executed.

In the case where the determination as to safety in steps 10, 16 and 22 is "No", i.e. the received safety information is "not safe", the process jumps to step 28, where the safety output is shut off to halt the operation (ST28, ST29). By the way, the specific process in steps 28, 29 is similar to the process for the fault notice (hazardous) in the conventional safety network system, and therefore is not described in detail.

Figure 10:
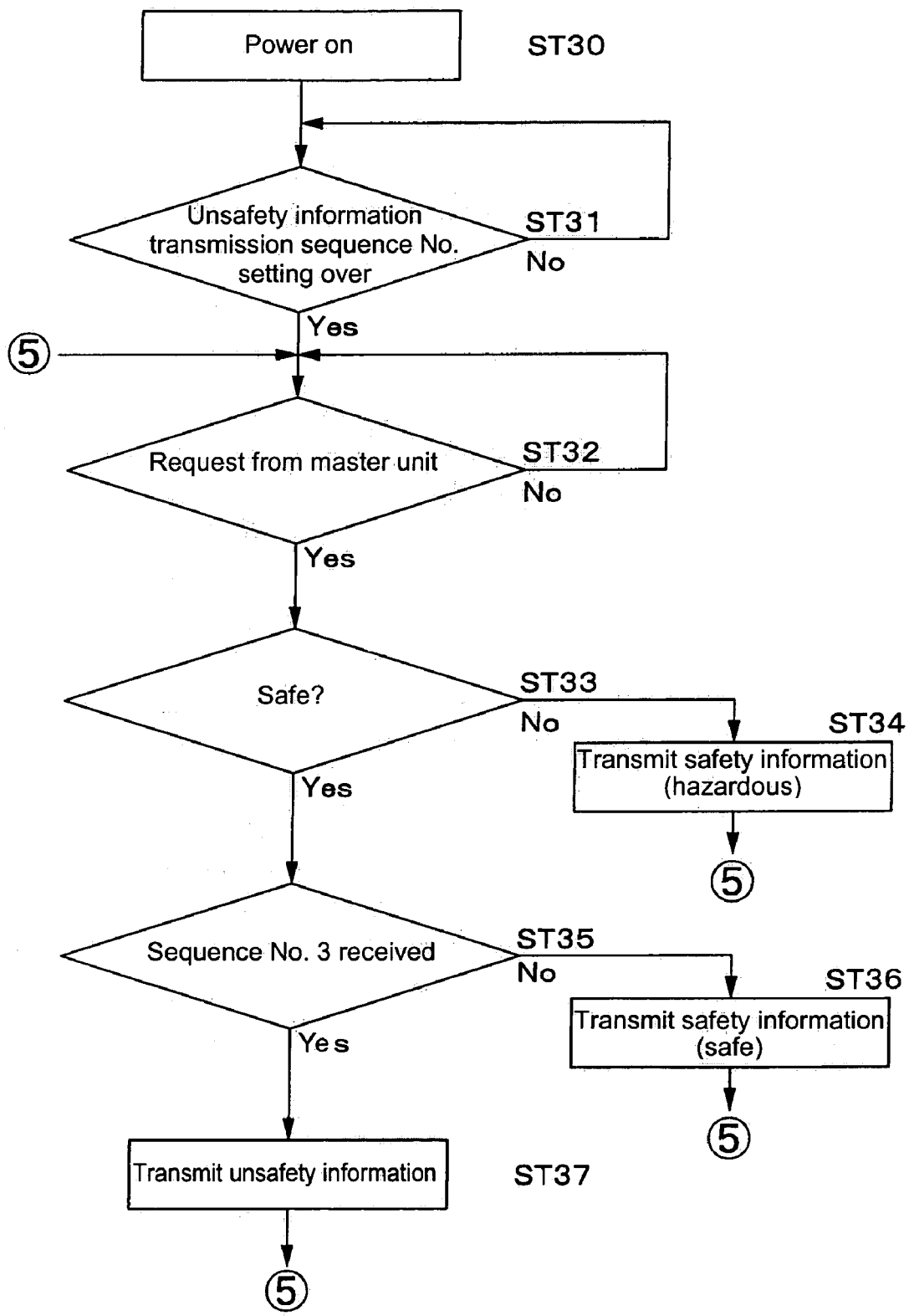
FIG. 10 is a flowchart for explaining the functions of the MPU of the safety slave unit.

On the other hand, the operation of the MPU 23 of each safety slave unit is shown in FIG. 10. Specifically, after power is thrown in, the sequence No. for transmitting the unsafety information sent from the master unit 1b is acquired and set. In this case, the sequence No. "3" is set as the timing of transmitting the unsafety information (ST30, ST31).

Next, a request from the master unit 1b is awaited (ST32), and upon receipt of the request, it is determined whether a safe state now prevails or not (ST33). In the case where no safe state prevails "hazardous" is transmitted as the safety information (ST34). In the case where a safe state prevails, on the other hand, the sequence No. added to the request is checked, and in the case where the sequence No. is "3", the unsafety information is transmitted, while in the case of other than 3, the safety information (safe) is transmitted (ST35, ST36, ST37). After that, the process of steps 32 to 37 is repeatedly executed.

The process described above, as viewed from the operation of one safety slave unit, is shown in FIG. 11. Specifically, the requests sent from the master unit 1b have added thereto the sequence Nos. 1 to 3 sequentially repeated in such an order as "1→2→3→1 . . . ". Upon receipt of the request of the sequence No. "3", the unsafety information is returned. As a result, as shown in FIG. 11(a), assuming that a safety slave unit is in a safe state, the master unit receives the unsafety information of the particular safety slave unit at the rate of once every three times, and therefore can confirm the safety by receiving the particular unsafety information.

Also, as shown in FIG. 11(b), in the case where the safety is ended when the sequence No. is "3", the safety response is given without sending the unsafety information. Thus, the master unit cannot receive the unsafety information but is informed of a hazardous situation from the safety response, and therefore executes a predetermined safety process such as a halt process. By the way, though not shown, in the case where the safety ends with the request of the sequence No. 1 or 2, the safety response (fault notice) is sent as usual, so that a predetermined safety process is executed based on the particular safety response.

In the embodiment described above, the unsafety information is acquired at the rate of once every N times. However, this invention is not limited to such a rate but the unsafety information can be acquired at regular time intervals. In this case, the sequence No. for transmitting the unsafety information is not determined as described above, but a flag is attached or otherwise to discriminate the normal safety information request and the unsafety information request from each other on the part of the safety slave unit. The unsafety information request control unit 15 has a timer, and each time a set time passes, sends a trigger signal to the MPU 10. The MPU 10, which normally issues a safety information request, issues an unsafety information request upon receipt of the trigger signal.

Also, in the case where the unsafety information is collected by the number of the communication cycles, assume that the master unit issues both the safety information request and the unsafety information request as in the aforementioned case. The unsafety information request control unit 15 may have a counter, and counts the number of times the request is issued. Once a predetermined number of times is reached, a trigger signal is output, and the MPU 10 that has received the trigger signal may output an unsafety information request.

In the example described above, the timing of acquiring the unsafety information is controlled by the master unit. This invention is not limited to such a configuration, but the acquisition timing may alternatively be controlled on the part of the safety slave unit. In such a case, as shown in FIG. 4, the safety slave unit 2 is equipped with an unsafety information transmission control unit 28. This unsafety information transmission control unit 28 includes a timer or a counter and applies a trigger signal for unsafety information transmission to the MPU 23 at a preset timing (after predetermined time or predetermined communication sessions) of updating the unsafety information.

The MPU 23, at the request of the master unit 1b, normally gives a safety response and returns the safety information (safe/hazardous). Upon receipt of a trigger signal, on the other hand, the MPU 23 checks the present safety state in response to a request, and in the case where a safe state prevails, sends the unsafety information. In the case where no safe state prevails (abnormal or hazardous), however, the safety response is returned even when a trigger signal is received. By the way, in order that the master unit may be informed which of the safety information and the unsafety information is transmitted, the MPU 23 attaches a recognition bit in the transmission frame as shown in FIG. 6 also in the case under consideration, and sets it to "0" or "1".

The master unit 1b, on the other hand, transmits a request to the safety slave units sequentially in predetermined communication cycles and waits for a response from a corresponding safety slave unit. Upon receipt of the transmission frame from a safety slave unit, the master unit 1b confirms the recognition bit and discriminates the safety information and the unsafety information from each other. In the case where the unsafety information is involved, the acquired unsafety information is stored in the unsafety information storage unit 14, while at the same time recognizing the safety. In the case where the received information is the safety information, on the other hand, the contents thereof are acquired, and in the case where no safe state prevails, a predetermined security process is executed.

Figure 12:
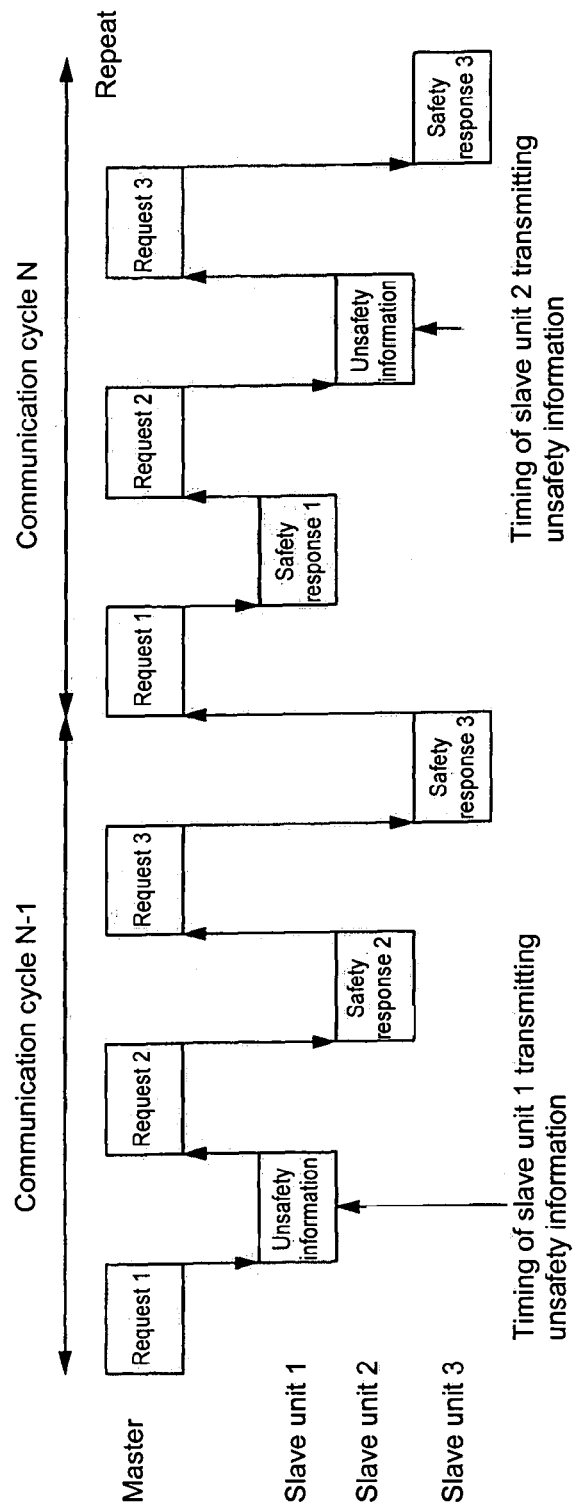
FIG. 12 is a diagram for explaining the operation of another embodiment.

A timing chart for data transmission and receipt between the master unit and the slave units for the above-mentioned operation is shown in FIG. 12. In the shown case, every safety slave unit is in a safe state, and therefore the respective unsafety information is transmitted at the timing of transmitting the unsafety information. The master unit that has received this unsafety information acquires the unsafety information on the one hand and can confirm the safety at the same time. In the case where no safe state prevails at the timing of transmitting this unsafety information, the safety response is returned. Also, in view of the fact that the transmission timing is managed by each safety slave unit, as shown, the unsafety information is not necessarily sent from all the safety slave units in the same communication cycle, as shown.

Furthermore, the embodiment described above concerns the master-slave method in which a desired slave unit returns a response to a request from a master unit. Specifically, the right to determine which of the safety information and the unsafety information is to be transmitted may be granted to either the master unit or the safety slave unit, as described already. In any way, the timing of transmission from each slave unit is derived from an external t rigger such as a request of the master unit. The slave unit as it is called in this invention, however, is not limited to the one included in the master-slave communication. Specifically, in spite of the naming "slave", an arbitrary communication method can be used. In this respect, strictly speaking, the slave unit according to the invention is considered to be different in concept with the generally defined slave. In other words, the slave unit as it is called in this invention can operate on an arbitrary communication protocol for actual transmission and receiving process as long as it has the function of transmitting while switching the safety information and the unsafety information at appropriate timing. Especially, the destination of the unsafety information to be transmitted according to the invention is not confined to the master unit or the controller, but may be other devices than the local node, i.e. other nodes such as the configurator (configuration tool), the monitoring devices or other slave units connected to a network.

The communication method can also be appropriately selected in accordance with the other party of transmission. The trigger for transmission is of course not limited to an external request such as from the master unit, for example, but the transmission may be based on an internal trigger (internal timer, an event generated when meeting predetermined conditions, etc.).

The "internal trigger" is based on the result of executing a predetermined process by a slave unit itself and generated in the particular slave unit. One example of an internal trigger is the fact that the unsafety information (the status information of the input/output unit, etc.) acquired by the slave unit develops into a preset status. Specifically, a n internal trigger may be generated in the case where the turn-on time of the input/output devices exceeds 5000 hours or the number of times operated exceeds ten thousands. An internal trigger signal may also be generated periodically upon each lapse of a predetermined time or at a predetermined time point as counted by an internal clock.

In the case where an internal trigger is generated when a preset status is attained, the frequent transmission of the unsafety information can be suppressed and the safety information can be transmitted in normal communication by appropriately setting the particular status. Thus, the required unsafety information can be transmitted efficiently by transmitting the unsafety information with the internal trigger generated at regular time intervals or when the life of the input/output devices is about to expire, in accordance with the operating conditions of the input/output devices. Specifically, the number of times operated and the turn-on time are not very important information and allowed to change by several times or several minutes from the preceding data. By suppressing the transmission of these information not so important, the safety information and the unsafety information can be transmitted efficiently.

Figure 13:
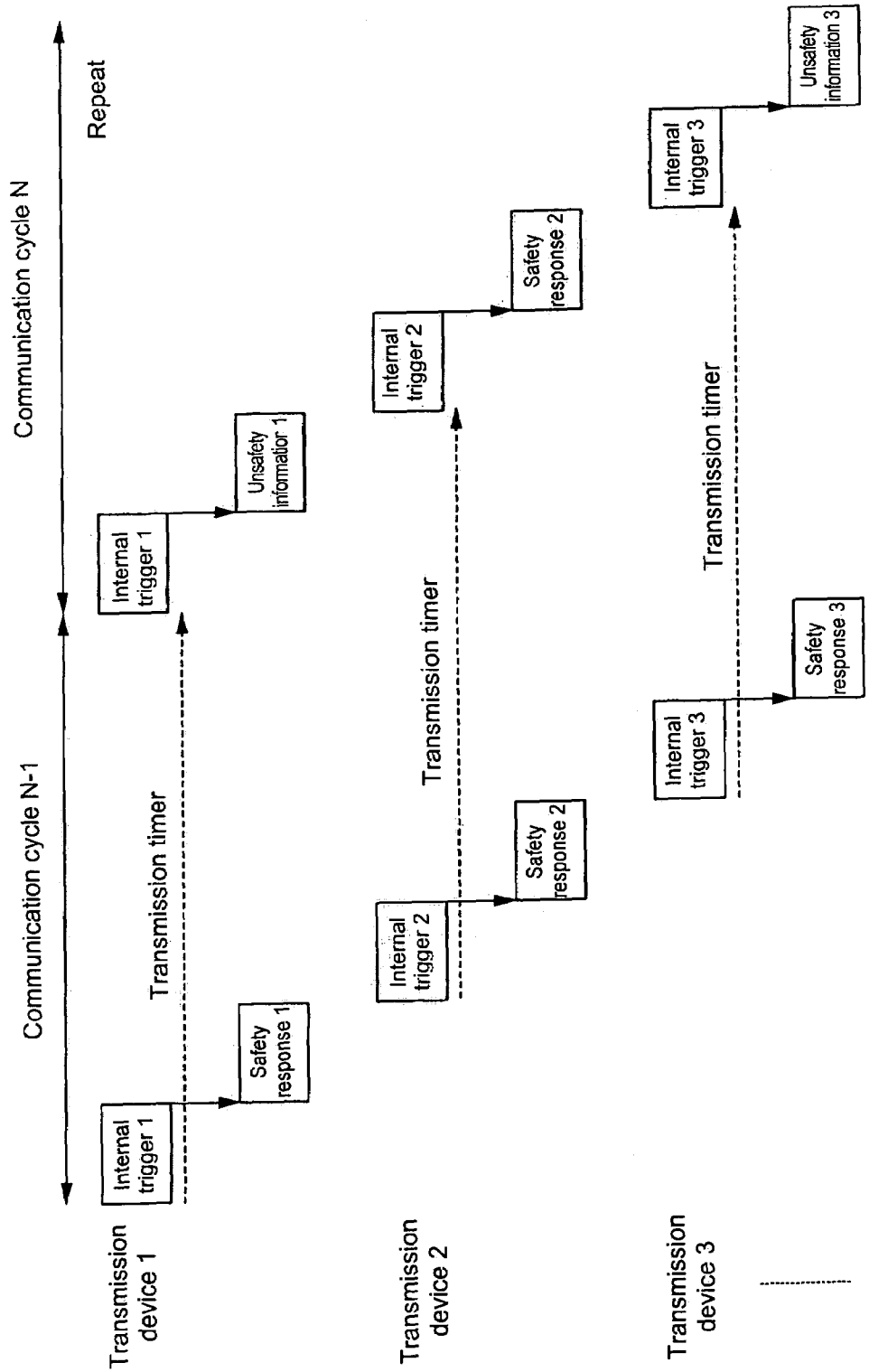
FIG. 13 is a diagram for explaining the operation of a modification.

An example of a time chart for transmitting the information from the safety slave unit based on this internal trigger is shown in FIG. 13. Specifically, each transmission device (safety slave unit) has an internal timer and generates an internal trigger at intervals of the transmission timer. In response to this internal timer, each safety slave unit outputs the safety information or the unsafety information to a predetermined destination. By setting this destination in advance, the information can be transmitted toward a master unit, other slave units or other nodes connected to the network.

Each safety slave unit transmits the information based on its own internal timer. In the case where any other slave unit is already transmitting the information, however, the slave unit trying to transmit the information stops the transmission. In the case where an attempt to transmit the information at the same time leads to a conflict on the network, the safety slave unit of higher priority order (smaller node number) continues the communication. As a result, the information can be transmitted from the safety slave units sequentially in a predetermined order in one communication cycle. By setting the transmission timer appropriately, the information can be subsequently repeatedly transmitted smoothly in the same order.

Figure 14:
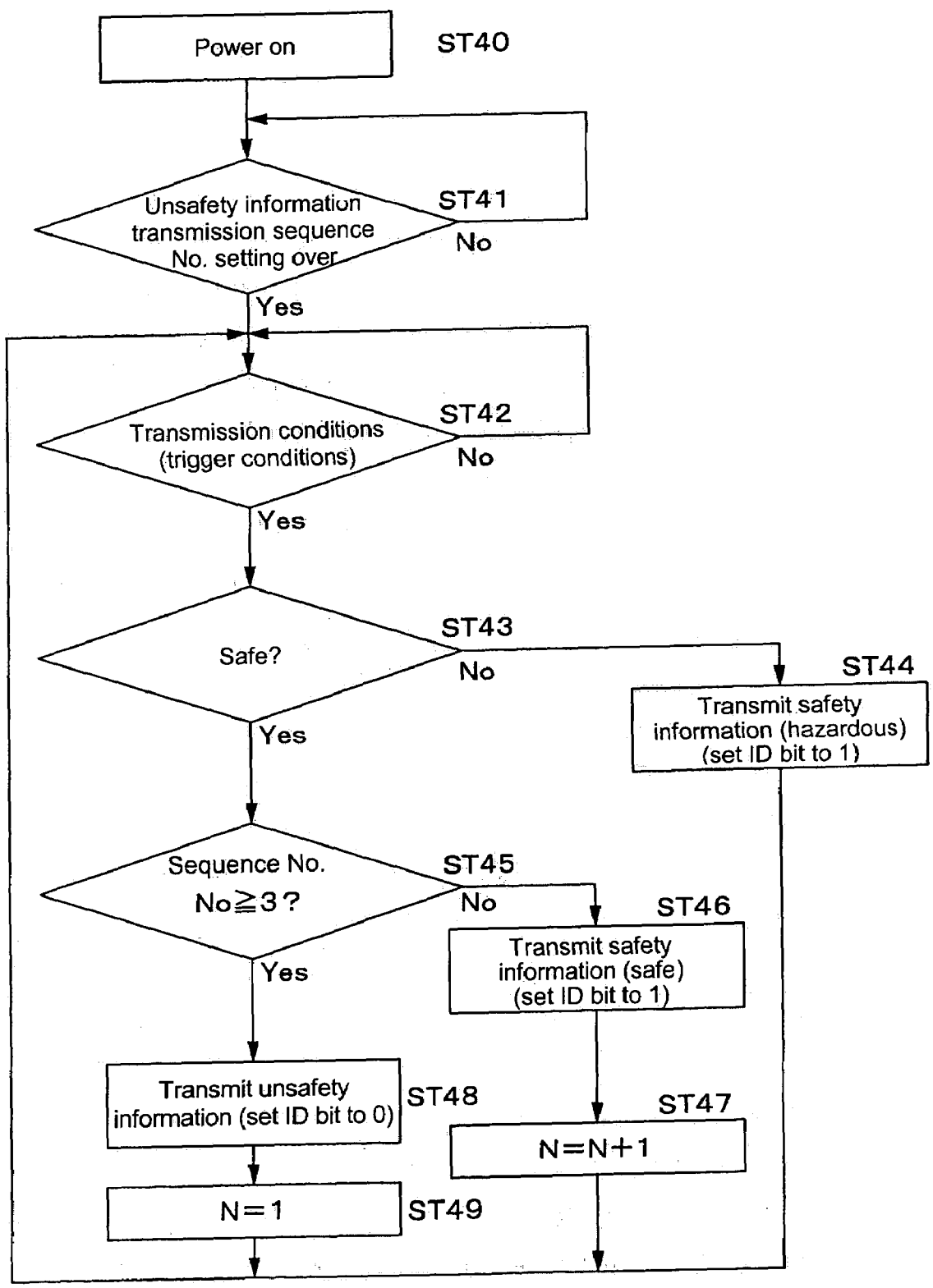
FIG. 14 is a flowchart for explaining the functions of the MPU of the safety slave according to a modification.

An example of the function of the MPU of the safety slave unit which executes the above-mentioned transmission process is shown in the flowchart of FIG. 14. This function basically corresponds to the processing flow shown in FIG. 10. Specifically, power is switched on first of all, and the unsafety information transmission sequence No. is set (ST41). In this example, the transmission sequence No. is set to "3" for all the safety slave units. This numerical value, however, is arbitrary and can of course be varied from one safety slave unit to another.

Upon complete setting, the generation of the transmission conditions, i.e. the internal trigger is awaited (ST42). Once the internal trigger is generated, it is determined whether a safe state prevails now or not (ST43), and in the case where no safe state prevails, the safety information (hazardous) is transmitted (ST44). In the case where a safe state prevails, on the other hand, the sequence No. is checked (ST45), and if it is less than 3, the safety information (safe) is transmitted, while at the same time incrementing N representing the sequence No. by 1 (ST46, ST47). Then, the process returns to step 42 to wait for the arrival of the next transmission conditions. In the case where the sequence No. is 3 or more, on the other hand, it indicates the unsafety information transmission timing, and therefore the unsafety information is transmitted (ST48). After that, N is set to 1 (ST49), followed by re turning to step 42 to wait for the arrival of the next transmission conditions.

The threshold value for determination in step 45 is set to "3" because the sequence No. for transmitting the unsafety information is set to "3" in step 41. In the case where the setting is not 3 in step 41, the criterion in step 45 is also changed accordingly.

Figure 15:
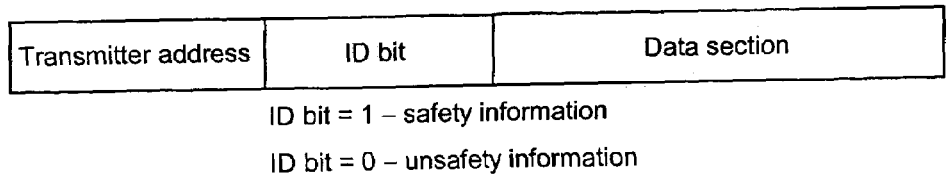
FIG. 15 is a diagram showing an example of the data structure of the transmission frame according to a modification.

Also, which of the safety information and the unsafety information is currently transmitted is determined by the identification bit (FIG. 15) set in the transmission frame. The safety slave unit, therefore, sets the identification bit in accordance with one of the safety information and the unsafety information for transmission.

Figure 16:
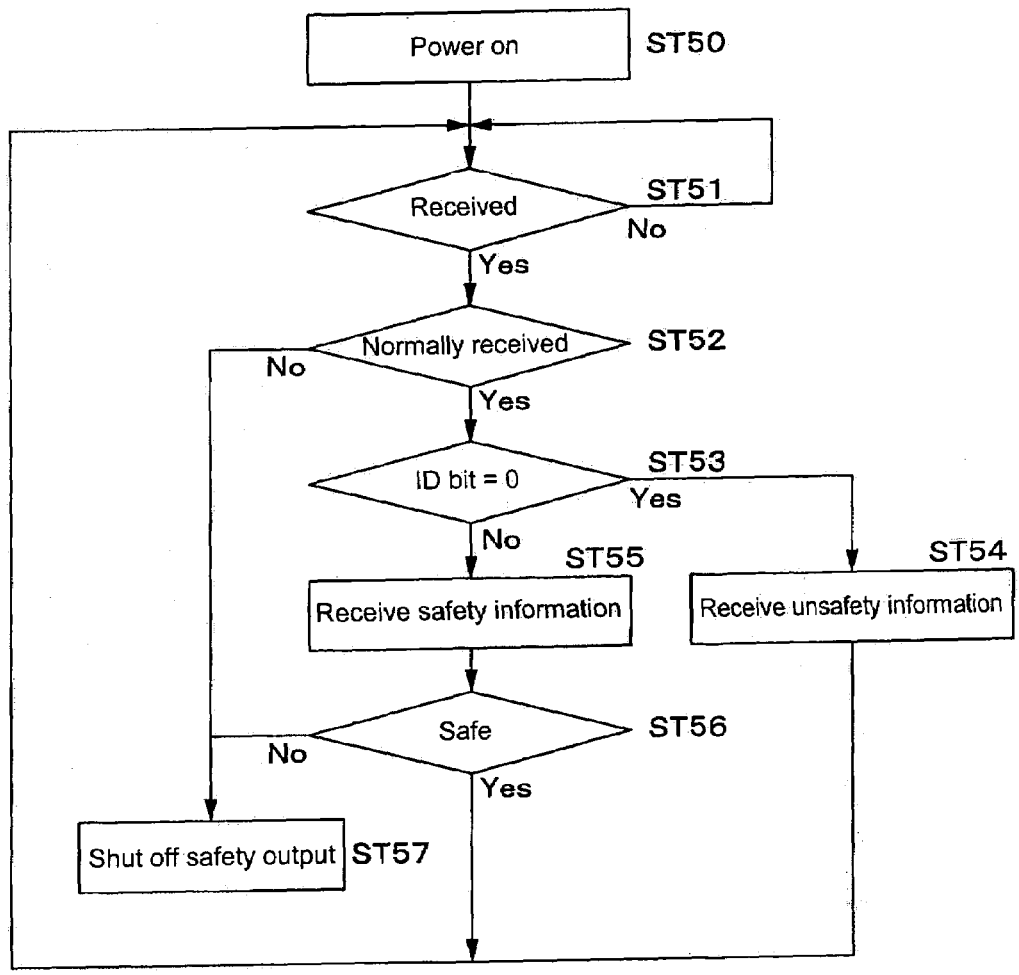
FIG. 16 shows a part of the flowchart for explaining the functions of the information receiving end according to a modification.

The device receiving the information from the safety slave unit has the function of executing the process of the flowchart shown in FIG. 16. Specifically, after power is switched on first, the arrival of a frame sent from the safety slave unit is awaited (ST51). Upon receipt of the frame, it is determined whether the frame is normally received or not, and in the case of abnormal receipt ("No" in step 52), the process such as stopping the output is executed by the safety output means (ST57). In the case of normal receipt, on the other hand, the identification bit is checked. In the case where the identification bit is zero, it indicates that the received data is the unsafety information, and therefore the process of receiving the unsafety information is executed (ST54). Specifically, the acquired unsafety information is stored in a predetermined area, the contents of the information are analyzed, or the processing is executed in accordance with the result of analysis. After that, the process returns to step 51 to wait for the arrival of the next frame.

In the case where the identification bit is 1, on the other hand, the safety information is involved, and therefore the safety information receiving process is executed (ST55) and it is determined whether the contents of the notice are safe or not (ST56). In the case where the contents of the notice is safe, the process returns to step 51 to wait for the arrival of the next frame. In the case where the contents of the notice is hazardous and not safe, on the other hand, the process of halting the output or other process for safe output is executed (ST57). By the way, the processing after receiving the safety information or the unsafety information is similar to the corresponding processing in the embodiments described above, and therefore is not explained in detail.

With regard to the identification bit, the foregoing description deals with a case in which the safety information and the unsafety information are indicated by one bit of "1" and "0", respectively. This invention, however, is not limited to this, but another information may be added. Specifically, in the case of unsafety information, the specific information stored in the data unit include various information such as the accumulated time of conduction or operation, the number of times operated, etc. of the input/output devices connected to the slave units, and in the case where only a numerical value is transmitted, the information associated with the particular numerical value may not be recognized. In such a case, the identification code for specifying the type of the unsafety information may be added in accordance with the contents of the data section. Further, a plurality of I/O terminals are provided. In an assumed case where eight I/O terminals are involved, for example, an 8-bit identification code is prepared so that a bit for identifying the safety information and the unsafety information is set for each I/O terminal. Also, in the case where all the eight I/O terminals transmit the unsafety information or the safety information, all the eight bits constitute the same identification bit. In such a case, the eight bits can be represented by one bit. As a result, the transmission data can be compressed and transmitted within a short length of time. In this case, however, a flag is required to discriminate an uncompressed identification code from a compressed identification code.

INDUSTRIAL APPLICABILITY

As described above, according to this invention, the unsafety information is transmitted on condition that a safe state prevails. Even in the case where the information other than the safety information (safety signal) is transmitted or received through a network while the system is in operation, therefore, the original response time of the safety information is not delayed.

The invention claimed is:

1. A safety network system constructed by connecting a safety controller and safety slave units through a safety network, comprising:
   a safety information transmission function provided for each of the safety slave units, for transmitting safety information for determining whether a safe state or a hazardous state prevails, and
   an unsafety information transmission function provided for each of the safety slave units, for transmitting unsafety information containing no safety information; and
   wherein the unsafety information transmission function transmits the unsafety information on condition that the safety slave units are in a safe state.

2. The safety network system according to claim 1, wherein the safety slave units transmit the safety information without sending the unsafety information in the case where it is determined that no safe state prevails at the timing of transmitting the unsafety information.

3. The safety network system according to claim 1, wherein the safety controller, upon receipt of the unsafety information, estimates that the safety slave unit constituting the transmitter of the unsafety information is in a safe state.

4. A safety slave unit for connecting to a safety network system constructed by connecting a safety controller and the safety slave unit through a safety network, comprising:
a safety information transmission function for transmitting safety information for determining whether a safe state or a hazardous state prevails and an unsafety information transmission function for transmitting the unsafety information containing no safety information; and
configured such that the unsafety information transmission function transmits the unsafety information on condition that the safety slave unit is in a safe state.

5. The safety slave unit according to claim 4, wherein
the safety slave is configured to determine whether a request received from the safety controller is a request for the safety information or the unsafety information,
in the case where the received request is a request for the safety information, the safety information is transmitted, and
in the case where the received request is a request for the unsafety information, the unsafety information is transmitted as long as the safety slave unit is in a safe state, and the safety information is transmitted as long as the safety slave unit is not in a safe state.

6. The safety slave unit according to claim 4, further comprising unsafety information transmission control means for controlling the timing of transmitting the unsafety information, configured such that the unsafety information is sent on condition that a safe state prevails at the timing of transmission.

7. A safety controller adapted to be connected to a safety network system constructed by connecting the safety controller and safety slave units through a safety network, comprising:
a fail-safe processing function for analyzing the contents of safety information, the safety information for determining whether a safe state or a hazardous state prevails, received from the safety slave units and in the case where it is determined that no safe state prevails, executing a predetermined process; and
a function of estimating that the safety slave unit at the transmitting end is in a safe state in the case where unsafety information is received, the unsafety information containing no safety information.

8. The safety controller according to claim 7, further comprising unsafety information request control means for controlling the timing of issuing a request to transmit the unsafety information.

9. A communication method for a safety network system constructed by connecting a safety controller and a safety slave unit to each other through a safety network, the method comprising:
transmitting, by the safety slave unit, one of safety information for determining whether a safe state or a hazardous state prevails and unsafety information containing no safety information toward the safety controller through the safety network at an appropriate timing; and
transmitting the unsafety information on condition that the safety slave unit is in a safe state.

10. An information collecting method for a safety network system constructed by connecting a safety controller and a safety slave unit to each other through a safety network, the method comprising:
transmitting, by the safety slave unit, safety information for determining whether a safe state or a hazardous state prevails and unsafety information containing no safety information, the unsafety information being transmitted on condition that the safety slave unit is in a safe state;
determining, by the safety slave unit, when transmitting information toward the safety controller, which of the safety information and the unsafety information is to be transmitted, and transmitting the information thus determined through the safety network; and
receiving, by the safety controller, the safety information or the unsafety information sent thereto through the safety network, and in the case where the received information is the unsafety information, storing the information based on the unsafety information.

11. A monitor method for a system constructed by connecting a monitor device further to a safety network system constructed by connecting a safety controller and a safety slave unit through a safety network, the method comprising:
transmitting, by the safety slave unit, safety information for determining whether a safe state or a hazardous state prevails unsafety information containing no safety information, the unsafety information being transmitted on condition that the safety slave unit is in a safe state;
acquiring, by the monitor device the unsafety information transmitted from the safety slave unit toward the safety controller;
analyzing the acquired unsafety information; and
storing the information based on the unsafety information.

* * * * *